Dec. 9, 1952 L. MANN 2,621,081
BICYCLE WHEEL ATTACHMENT
Filed Feb. 17, 1950 2 SHEETS—SHEET 1
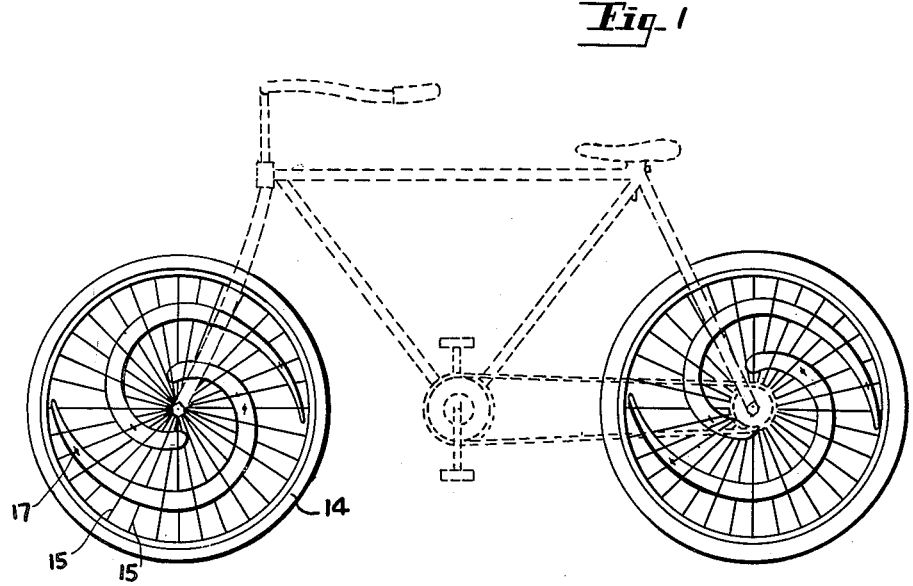
Fig. 1
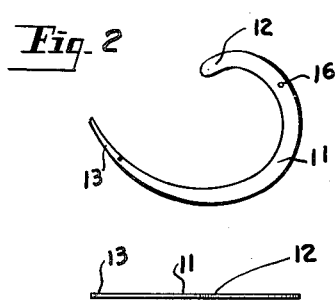
Fig. 2
Fig. 3
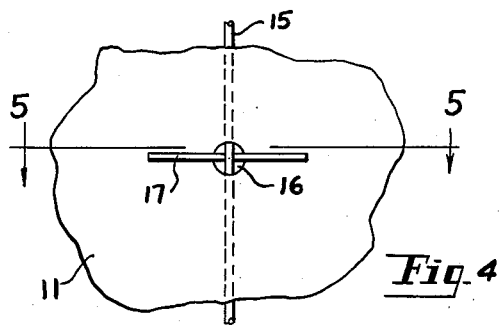
Fig. 4
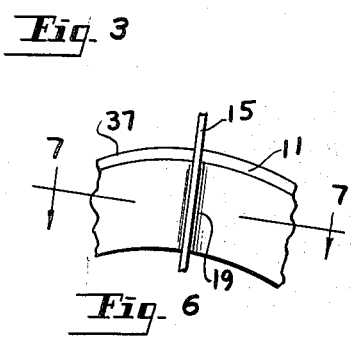
Fig. 6
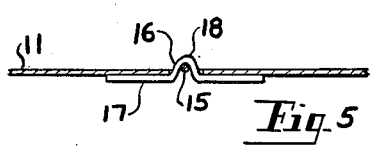
Fig. 5
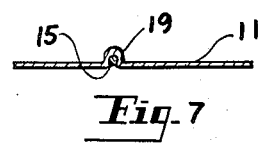
Fig. 7
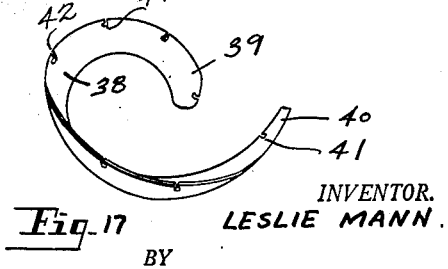
Fig. 17
INVENTOR.
LESLIE MANN.
BY
Robert A. Sloman
ATTORNEY.

Dec. 9, 1952            L. MANN            2,621,081
BICYCLE WHEEL ATTACHMENT
Filed Feb. 17, 1950            2 SHEETS—SHEET 2
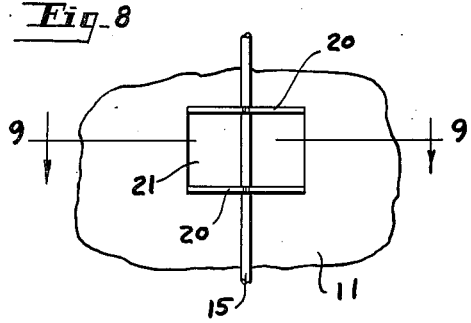
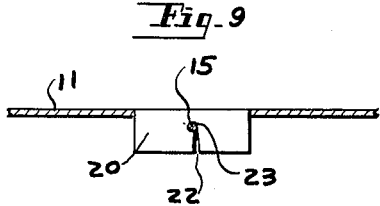
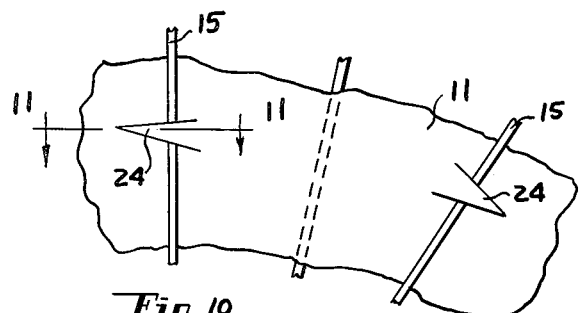
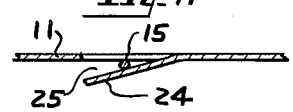
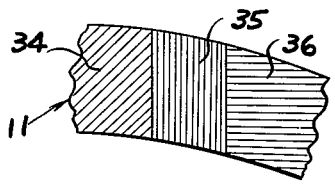
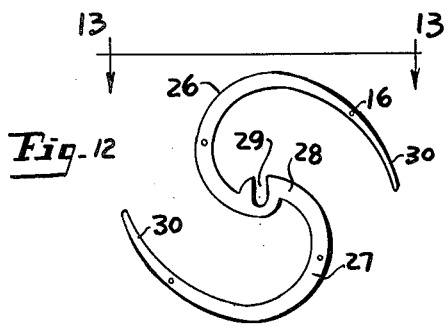
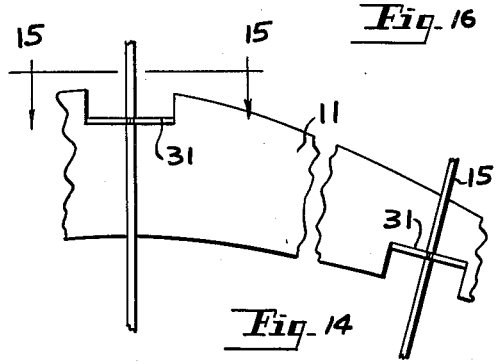
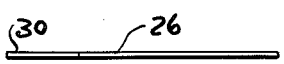
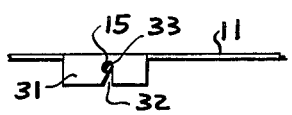
INVENTOR.
LESLIE MANN.
BY Robert A. Sloman
ATTORNEY.

Patented Dec. 9, 1952

2,621,081

UNITED STATES PATENT OFFICE 2,621,081

BICYCLE WHEEL ATTACHMENT

Leslie Mann, Detroit, Mich.

Application February 17, 1950, Serial No. 144,666

1 Claim. (Cl. 301—37)

1

This invention relates to an ornamental attachment for wire wheels, and more particularly to an ornamental bicycle wheel attachment.

It is the object of the present invention to provide a spirally shaped bicycle wheel ornament adapted for positioning upon a bicycle wheel to produce a pleasing visual effect upon rotation thereof.

It is the further object of this invention to provide a spirally shaped bicycle wheel ornament for positioning upon a bicycle wheel, being mounted thereon between and upon the interior of the wire spokes thereof.

It is the further object of this invention to provide means for effectively securing said attachment to the bicycle wheel for rotation therewith.

These and other objects will be seen from the following specification and claim in conjunction with the appended drawings in which:

Fig. 1 is a side elevational view of a bicycle with the present ornamental attachment mounted upon its wheels.

Fig. 2 is a side elevational view of the present ornamental wheel attachment.

Fig. 3 is a plan view thereof.

Fig. 4 is a fragmentary broken away side view of a portion of the present wheel attachment illustrating one means of securing the same to the wheel spoke.

Fig. 5 is a section on line 5—5 of Fig. 4.

Fig. 6 is a fragmentary side view of said attachment illustrating a different means of attachment.

Fig. 7 is a section taken on line 7—7 of Fig. 6.

Fig. 8 is a fragmentary side view of said attachment illustrating a different means of securing the same to the wheel spoke.

Fig. 9 is a section taken on line 9—9 of Fig. 8.

Fig. 10 is a fragmentary side view of the present wheel ornament illustrating a different means of attachment.

Fig. 11 is a section on line 11—11 of Fig. 10.

Fig. 12 is an elevational view of a slight variation in the present ornamental wheel attachment.

Fig. 13 is a plan view thereof.

Fig. 14 is a fragmentary side view of the present ornament illustrating still another method of attachment to the wheel spoke.

Fig. 15 is a section on line 15—15 of Fig. 14.

Fig. 16 is a fragmentary side elevational view of a portion of said ornament, being hatched to show the application of various colors, and Fig. 17 is a perspective view of a variation in the form of said ornament.

2

It will be understood that the above drawings illustrate merely a preferred embodiment of the present invention, with several different types of attachment being shown, by way of illustration, and that other embodiments and other methods of attachment are contemplated within the scope of the claim hereinafter set out.

Referring to the drawings, a two wheel bicycle is shown fragmentarily in Fig. 1 including the wheels 14 with their spokes 15, and with a pair of spirally shaped ornaments 11, positioned upon said wheels and in between the inner walls of said spokes, and immovably secured in position.

The ornamental bicycle wheel attachment could be adapted to any similar type of wheel including spokes such as in the case of a motorcycle.

The ornamental attachment 11 is constructed preferably of a semi-rigid material such as paper or cardboard, a plastic material, or maybe metallic, said ornament including a leading portion 12 of minimum radius, and a trailing elongated portion 13 of gradually increasing radius to thereby define a general spiral shape.

Naturally there are various methods of attaching the present ornaments to the bicycle wheel, preferably between and within the spokes, and a number of methods are hereafter described for illustration.

It is contemplated that the ornaments hereafter described could merely be positioned between the spokes with portions of said ornaments merely wedged between adjacent spokes as at the wheel rim for securing said ornaments in place.

It is also contemplated that one spiral ornament may be employed upon each wheel, arranged so that the trailing end portion 13 extends in opposite directions, or on the other hand a pair of ornaments may be employed as shown in the present preferred embodiment in Figure 1. However the arrangement of the wheel ornaments between the front and rear wheels could be reversed to thereby obtain different visual effects upon rotation of the wheels.

As shown in Figures 1, 2, 3, 4 and 5 there are provided at least a pair of transverse openings 16 within the ornament 11, and a flexible clip 17 is looped around the spoke 15 as at point 18 with the ends of clip 17 extending through openings 16 and bent into substantial parallel alignment and engagement with the outer surface of said ornament. This provides a very simple method for removably securing the wheel ornaments upon the wheel spokes.

With the ornament 11 constructed of a plastic material, for example, as in Figures 6 and 7, there may be provided therein two or more transverse ridges with corresponding grooves 19 upon the opposite side into which the spokes 15 may be snugly inserted and retained. It will be understood that the grooves 19 must be properly spaced and at the correct angle so as to receive the corresponding spoke.

In Figure 8 intermediate portions of the ornament 11 are cut and the parallel spaced upright securing tabs 20 are provided, defining the intermediate space 21 in said ornament. Inwardly converging slots 22 are formed within the tabs 20 terminating at their inner ends in the circular opening 23 which is offset with respect to the apex of said slots, being adapted for receiving and securing the wheel spoke 15 as shown in Figure 9.

Figures 10 and 11 show still another device for attaching the ornament within and between the wheel spokes 15, including the general triangularly shaped oppositely arranged tabs 24 which are formed from the material of the ornament base 11 and which are bent outwardly at an angle thereto for retainingly receiving an adjacent pair of said spokes 15 upon one side of said ornament.

While a separate pair of spirally shaped ornaments are shown in Figure 1, being the preferred method of application of said ornaments to the bicycle wheel, it is contemplated that said ornaments could be formed integrally as shown at 26 and 27 in Figure 12, representing a pair of oppositely arranged spirals which are centrally joined at their leading portions as by the hub engaging central element 28 which is transversely slotted at 29 to receive the wheel hub by which said ornament is mounted. Ornaments 26 and 27 as formed have the trailing elements 30 which extend in opposite directions as shown to produce a pleasing visual effect upon rotation of the wheels.

Figures 14 and 15 illustrate a variation in the method of attachment shown in Figures 8 and 9 in that separate tabs 31 are bent outwardly at right angles to the general surface of the ornament body 11 and have formed therein converging slots 32 terminating in the offset circular opening 33 within which the spoke 15 is snugly received and secured.

It is certainly contemplated that there may be various other means of attachment of the present bicycle wheel ornaments which will perform the function of removably securing said ornaments in position within the wheel spokes as shown in the drawings.

Referring to Figure 16 there is shown a portion of a wheel ornament 11 which is painted in different colours such as the section 34 hatched to indicate brown, section 35 hatched to indicate red, and section 36 hatched to indicate blue color. Naturally various colors could be employed for producing different visual effects and pleasing optical illusions.

Referring to Figures 6 and 7 it is contemplated that the ornamental wheel element 11 may have molded therein a bead 37, or portion of increased thickness within which the transverse slotted portion 19 would be formed. This bead would add rigidity to the element and provide more material within which to form said slotted portion 19.

Referring to Figure 17 there is shown a perspective view of a variation in the form of the present wheel attachment from that shown in Figures 1 and 2. Instead of being flat, the bicycle ornament 38 with leading portion 39 and trailing portion 40 has a generally conical shape. Said ornament is preferably molded in the shape shown and is positioned between the wheel spokes in the manner shown in Figure 1.

A plurality of small circular spoke receiving openings 41 are formed within said ornament adjacent the edges thereof, and corresponding angular slots 42 extend inwardly from its outer edges joining said openings, whereby the adjacent portion of the wheel spoke may be nested and retained relative to said ornament. In view of the spiral shape of said ornament it is contemplated that slots 42 have the proper angularity so as to coincide with the adjacent portion of the spoke.

The generally conical shape of this ornament provides a different and very pleasing visual effect upon rotation than is effected with the ornament shown in Figures 1 and 2.

Having described my invention reference should now be had to the following claim for determining the scope thereof.

I claim:

In combination with a bicycle wheel having a plurality of wire spokes, a generally conical spirally shaped ornamental element mounted and secured upon said wheel between the inner surfaces of said spokes, there being a plurality of spaced spoke receiving openings formed in said element adjacent one of its peripheral edges and corresponding angularly arranged slots interconnecting said openings and said peripheral edge permitting relative insertion of said spokes within said openings.

LESLIE MANN.

REFERENCES CITED

The following references are of record in the file of this patent:

UNITED STATES PATENTS

| Number | Name | Date |
| --- | --- | --- |
| 1,952,708 | Gruenberg | Mar. 27, 1934 |
| 2,558,423 | Dobrosky | June 26, 1951 |

FOREIGN PATENTS

| Number | Country | Date |
| --- | --- | --- |
| 6,818 | Great Britain | of 1892 |

OTHER REFERENCES

American Bicyclist and Motorcyclist, January 1949, page 51 (see photographs).